A. S. NICKERSON.
RESILIENT WHEEL.
APPLICATION FILED AUG. 28, 1920.
1,414,093. Patented Apr. 25, 1922.
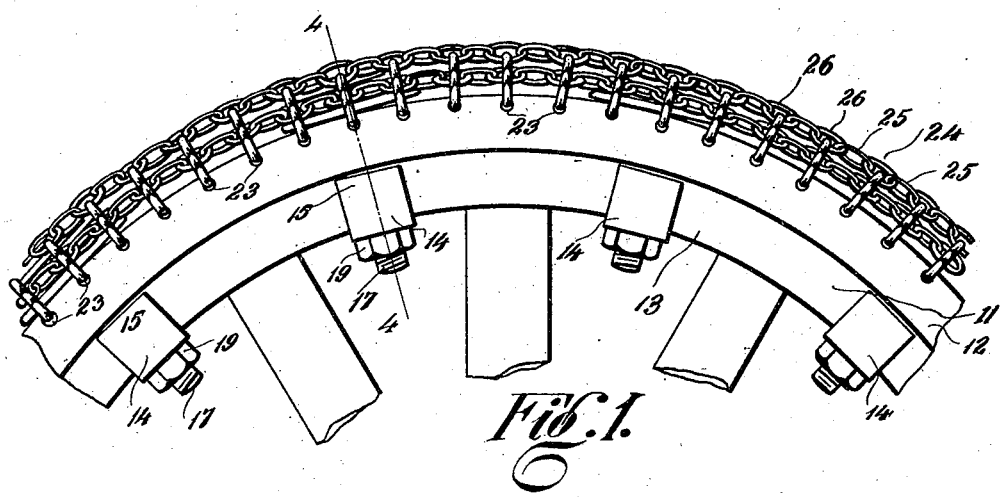
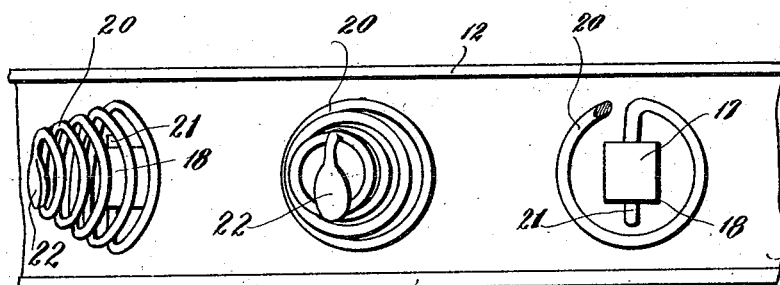
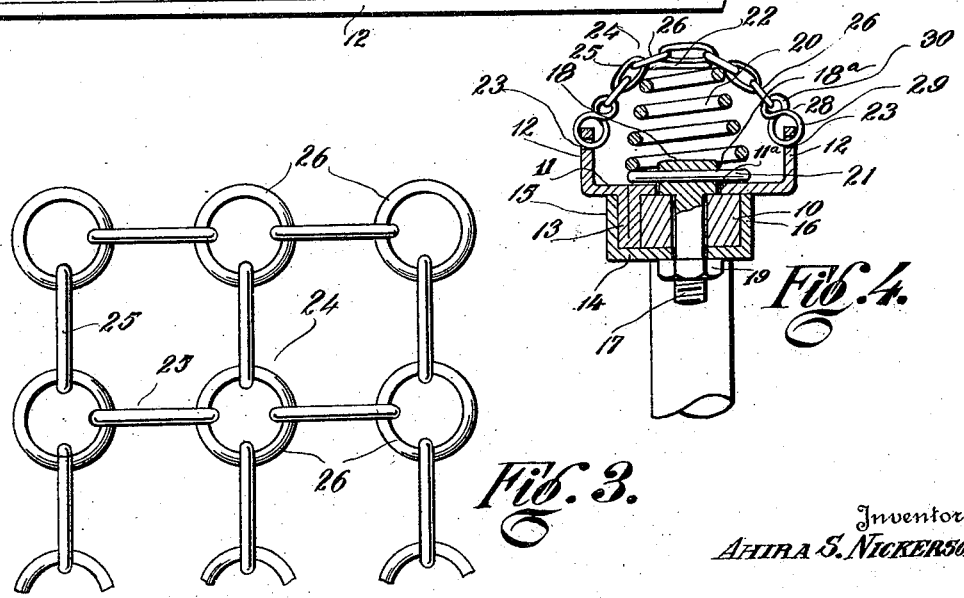
Inventor
AHIRA S. NICKERSON
By Watson E. Coleman
Attorney
WITNESSES

UNITED STATES PATENT OFFICE.

AHIRA S. NICKERSON, OF WESTPORT, MASSACHUSETTS.

RESILIENT WHEEL.

1,414,093. Specification of Letters Patent. Patented Apr. 25, 1922.

Application filed August 28, 1920. Serial No. 406,585.

*To all whom it may concern:*

Be it known that I, AHIRA S. NICKERSON, a citizen of the United States, residing at Westport, in the county of Bristol and State of Massachusetts, have invented certain new and useful Improvements in Resilient Wheels, of which the following is a specification, reference being had to the accompanying drawings.

This invention relates to resilient wheels, and more particularly to a wheel embodying a spring tread.

An important object of the invention is to provide a novel means for attaching the rim or tread member to the felly of the wheel.

A further object of the invention is to provide means whereby the members supplying resiliency to the tread may be simultaneously attached to the wheel with the attachment of the rim member.

A still further object of the invention is to provide a wheel of this character having a resilient metallic tread, and wherein the tread is formed of a chain mesh.

Other objects and advantages will become apparent throughout the course of the following description.

In the accompanying drawings, wherein for the purpose of illustration is shown a preferred embodiment of my invention and wherein like reference characters designate like parts throughout, Figure 1 is a fragmentary elevational view of an automobile wheel embodying my invention.

Figure 2 is a plan view thereof but with the tread or chain mesh removed.

Figure 3 is a detail view of a tread or chain mesh.

Figure 4 is a section on line 4—4 of Figure 1.

Referring now more particularly to the drawings, the numeral 10 designates the felly of a wheel, and the numeral 11 a rim or tread attaching member. This rim, for a purpose presently to appear, is provided upon its marginal edges with flanges 12.

Upon the inner surface of the rim is formed, to one side thereof an inwardly directed, annular flange 13, in the present instance formed by bending the wall of the rim to form an inwardly directed flange. This flange when the rim is in position upon the felly engages against one side face thereof. Retaining members 14 are provided each U-shaped in form, one arm 15 of the members engaging against the outer member of the flange 13 while the other arm 16 thereof engages against the face of the felly 10 remote to that engaged by the inner face of the flange 13.

The rim 11 has formed therein at spaced intervals, openings $11^a$. Bolts 17 are provided extending through the rim, felly and straps 14. The headed ends of these bolts are directed outwardly and are of such size that they will enter the openings $11^a$. The opposite ends of the bolts are threaded for the reception of nuts 19.

Springs 20 are provided having at their lower ends, or what might be properly termed their inner ends, horizontal extending portions 21, which extend through transverse openings $18^a$ formed in the heads 18 of the bolts 17. It will be obvious that by tightening upon the nuts 19 the ends 21 of the springs are brought downward to bind firmly against the outer face of the rim 11 and that simultaneously the straps 14 are tightened. These straps prevent transverse movement of the rim 11 upon the felly 10 and the bolts 17 prevent longitudinal movement thereof.

The outer ends of the springs are preferably flattened as at 22, for a purpose presently to appear. Formed in the flanges 12 adjacent the outer edges thereof, are a series of openings 23 extending through the entire length of these flanges. A tread 24 is provided comprising, in the present instance, a mesh chain. This mesh chain is formed of a plurality of vertical links 25 preferably oval in shape and a plurality of horizontal links preferably circular in shape. The horizontal and vertical links are alternated, as clearly shown in the drawings.

An inspection of the drawings will reveal the fact that this chain mesh tread is formed of a series of short transverse chains each provided at their ends with a horizontal link 26. The corresponding horizontal links 26 are connected by longitudinally extending vertical links 25. The interstices between the links of the chain are of such size that the ends of the springs 20 may not project therethrough; and in placing the tread in position this is preferably done while the springs 20 are under a slight compression in order that the chain tread may not be loose enough to rattle.

The chain tread is fastened in position by a series of members 28 each embodying a vertical loop 29 which engages in the openings 23 of the flange 12 and a second vertical loop 30 engaging in the horizontal link 26 at the end of the corresponding transverse chain. It will, of course, be obvious that in the construction of my device the springs 20 will be varied in strength in accordance with the load that is to be borne by the wheel.

It will likewise be obvious that by reason of its simplicity of construction and the ease with which its members can be assembled and the cheapness with which it may be manufactured my invention is particularly adapted for the use for which it is intended, and that the construction of the same as herein illustrated may be somewhat modified without in any manner departing from the spirit of my invention. I accordingly do not limit myself to the specific construction hereinbefore set forth, except as so limited by the subjoined claims.

Having now described my invention, what I claim is:

1. In a device of the type described, the combination with a rim provided upon its marginal edges with outstanding flanges and upon its inner surface with an inwardly extending flange adapted to engage against one side face of the felly of the wheel, of clamping straps adapted to engage the outer face of said flange and the side face of the felly of the wheel remote from that engaged by said flange, a tread member carried by said flanges, a plurality of resilient supporting members for said tread member disposed about said rim and common means for securing said resilient members in position and securing said straps to the felly of the wheel.

2. In a device of the type described, the combination with a rim provided upon its marginal edges with outstanding flanges and upon its inner surface with an inwardly extending flange adapted to engage against one side face of the felly of a wheel, of clamping straps adapted to engage the outer face of said flange and the side face of the felly of the wheel remote from that engaged by said flange, a tread member carried by said flanges, a plurality of resilient supporting members for said tread member disposed about said rim and common means for securing said resilient members in position and securing said straps to the felly of the wheel, said common means likewise serving to prevent circumferential shifting of the rim upon the felly.

3. In a device of the type described, the combination with a rim provided upon its marginal edges with outstanding flanges and upon its inner surface with an inwardly extending flange adapted to engage against one side face of the felly of a wheel, of clamping straps adapted to engage the outer face of said flange and the side face of the felly of the wheel remote from that engaged by said flange, a tread member carried by said flanges, a plurality of springs circumferentially spaced about said rim and forming a support for said tread, spaced aligned openings formed in said rim and felly, bolts extending through said openings, an opening formed in each of said straps through which one of said bolts extends and means for securing said springs to said bolts.

4. In a device of the type described, the combination with a rim provided upon its marginal edges with outstanding flanges and upon its inner surface with an inwardly extending flange adapted to engage against one side face of the felly of a wheel, of clamping straps adapted to engage the outer face of said flange and the side face of the felly of the wheel remote from that engaged by said flange, a tread member carried by said flanges, a plurality of springs circumferentially spaced about said rim and forming a support for said tread, spaced alinged openings formed in said rim and felly, bolts having their headed ends disposed outwardly extending through said openings, an opening formed in each of said straps through which one of said bolts extends and means for securing said springs to said bolts comprising transverse openings formed in the heads of said bolts through which portions of said springs extend, the openings of said rim being of sufficient size to receive the heads of said bolts therein.

In testimony whereof I hereunto affix my signature.

AHIRA S. NICKERSON.